United States Patent
Brugman et al.

(10) Patent No.: US 11,206,677 B2
(45) Date of Patent: Dec. 21, 2021

(54) SHARING VEHICLE MAP DATA OVER TRANSMISSION MEDIA SELECTED ACCORDING TO URGENCY OF THE MAP DATA

(71) Applicant: TOYOTA MOTOR NORTH AMERICA, INC., Plano, TX (US)

(72) Inventors: Louis Anthony Brugman, Frisco, TX (US); Jason O. Schell, Dallas, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 16 days.

(21) Appl. No.: 16/540,703

(22) Filed: Aug. 14, 2019

(65) Prior Publication Data

US 2021/0051684 A1  Feb. 18, 2021

(51) Int. Cl.
  *H04W 72/12* (2009.01)
  *H04W 4/40* (2018.01)
  *G08G 1/09* (2006.01)

(52) U.S. Cl.
  CPC .......... *H04W 72/1242* (2013.01); *G08G 1/09* (2013.01); *H04W 4/40* (2018.02)

(58) Field of Classification Search
  CPC ....... H04W 72/1242; H04W 4/40; G08G 1/09
  See application file for complete search history.

(56) References Cited

U.S. PATENT DOCUMENTS

| | | | |
|---|---|---|---|
| 8,594,923 B2 | 11/2013 | Wong | |
| 9,565,625 B1* | 7/2017 | MacNeille | ........... H04W 24/00 |
| 2005/0273188 A1* | 12/2005 | Barwicz | ................. G06F 17/00 |
| 2007/0241932 A1* | 10/2007 | Otero | ....................... G08G 1/00 |
| 2007/0259637 A1* | 11/2007 | Basir | ....................... H04B 1/06 |
| 2011/0018736 A1* | 1/2011 | Carr | ...................... G08G 1/123 |
| 2014/0204926 A1* | 7/2014 | Ota | ...................... H04W 48/16 |
| 2017/0243465 A1* | 8/2017 | Bourne | ................. G08B 21/24 |

FOREIGN PATENT DOCUMENTS

| | | |
|---|---|---|
| CN | 101358851 | 2/2009 |
| CN | 102800205 | 11/2012 |
| EP | 3453008 | 3/2019 |
| WO | 2017192358 | 11/2017 |

* cited by examiner

*Primary Examiner* — Ronald B Abelson
(74) *Attorney, Agent, or Firm* — Sheppard, Mullin, Richter & Hampton LLP; Hector A. Agdeppa; Daniel N. Yannuzzi

(57) ABSTRACT

Vehicles, media, and methods are provided for sharing vehicle map data over transmission media selected according to urgency of the map data. One vehicle includes a hardware processor; and a non-transitory machine-readable storage medium encoded with instructions executable by the hardware processor to perform a method comprising: receiving information relating to a road; determining an urgency level of the information; selecting one of a plurality of transmission media according to the determined urgency level; and transmitting the information over the selected transmission medium.

18 Claims, 5 Drawing Sheets

SHARING VEHICLE MAP DATA OVER TRANSMISSION MEDIA SELECTED ACCORDING TO URGENCY OF THE MAP DATA

TECHNICAL FIELD

The present disclosure relates generally to vehicles, and in particular, some implementations may relate to vehicles sharing map data.

DESCRIPTION OF RELATED ART

Modern vehicles increasingly store and use onboard map databases, primarily for navigation. In autonomous vehicles such map databases are a requirement, as these vehicles navigate according to the onboard map data. Accordingly, ways to share map data with vehicles is an important and growing area of research and development.

BRIEF SUMMARY OF THE DISCLOSURE

According to various embodiments of the disclosed technology, vehicles, media, and methods are provided for sharing vehicle map data over transmission media selected according to urgency of the map data.

In general, one aspect disclosed features a vehicle, comprising: a hardware processor; and a non-transitory machine-readable storage medium encoded with instructions executable by the hardware processor to perform a method comprising: receiving information relating to a road; determining an urgency level of the information; selecting one of a plurality of transmission media according to the determined urgency level; and transmitting the information over the selected transmission medium.

Embodiments of the vehicle may include one or more of the following features. In some embodiments, the method further comprises: determining a location of the vehicle; and transmitting the location of the vehicle, at the determined time of transmission, over the selected transmission medium. In some embodiments, the method further comprises: determining a location of the vehicle; and selecting the one of the plurality of transmission media according to the determined urgency level and the location of the vehicle. In some embodiments, receiving information relating to the road comprises: receiving the information as a message from another vehicle. In some embodiments, receiving information relating to the road comprises: receiving the information from a sensor of the vehicle. In some embodiments, the method further comprises: determining a time of transmission according to at least one of (i) the determined urgency level and (ii) the selected transmission medium; and transmitting the information, at the determined time of transmission, over the selected transmission medium. In some embodiments, the method further comprises: downloading map data over the selected transmission medium; selecting one of a plurality of dynamic layers of a map database stored in the vehicle according to the determined urgency level; and updating the selected dynamic layer according to the downloaded map data.

In general, one aspect disclosed features a non-transitory machine-readable storage medium encoded with instructions executable by a hardware processor of a computing component, the machine-readable storage medium comprising instructions to cause the hardware processor to perform a method for a vehicle, the method comprising: receiving information relating to a road; determining an urgency level of the information; selecting one of a plurality of transmission media according to the determined urgency level; and transmitting the information over the selected transmission medium.

Embodiments of the medium may include one or more of the following features. In some embodiments, the method further comprises: determining a location of the vehicle; and transmitting the location of the vehicle, at the determined time of transmission, over the selected transmission medium. In some embodiments, the method further comprises: determining a location of the vehicle; and selecting the one of the plurality of transmission media according to the determined urgency level and the location of the vehicle. In some embodiments, receiving information relating to the road comprises: receiving the information as a message from another vehicle. In some embodiments, receiving information relating to the road comprises: receiving the information from a sensor of the vehicle. In some embodiments, the method further comprises: determining a time of transmission according to at least one of (i) the determined urgency level and (ii) the selected transmission medium; and transmitting the information, at the determined time of transmission, over the selected transmission medium. In some embodiments, the method further comprises: downloading map data over the selected transmission medium; selecting one of a plurality of dynamic layers of a map database stored in the vehicle according to the determined urgency level; and updating the selected dynamic layer according to the downloaded map data.

In general, one aspect disclosed features a method for a vehicle, the method comprising: receiving information relating to a road; determining an urgency level of the information; selecting one of a plurality of transmission media according to the determined urgency level; and transmitting the information over the selected transmission medium. Some embodiments comprise determining a location of the vehicle; and transmitting the location of the vehicle, at the determined time of transmission, over the selected transmission medium. Some embodiments comprise determining a location of the vehicle; and selecting the one of the plurality of transmission media according to the determined urgency level and the location of the vehicle. In some embodiments, receiving information relating to the road comprises: receiving the information as a message from another vehicle. In some embodiments, receiving information relating to the road comprises: receiving the information from a sensor of the vehicle. Some embodiments comprise determining a time of transmission according to at least one of (i) the determined urgency level and (ii) the selected transmission medium; and transmitting the information, at the determined time of transmission, over the selected transmission medium.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Embodiments of the systems and methods disclosed herein can provide sharing vehicle map data over transmission media selected according to urgency of the map data. In some embodiments, vehicles upload the map data. In such embodiments, a vehicle may receive information relating to the environment, such as for a road, and may determine an urgency level of the information, for example by determining a type of the information. Based on the determined urgency level, the vehicle may select one of a plurality of transmission media. The vehicle may then upload the data over the selected transmission medium to a central map database, where it can be shared with other vehicles, and other people.

In some embodiments, vehicles download the map data. In such embodiments, a vehicle may determine an urgency of the downloaded map data according to a transmission medium over which the map data was communicated to the vehicle. Based on the determined urgency level, the vehicle may select one of a plurality of layers of an onboard map database for storing the map data. The vehicle may then share data from the map database with other vehicles, and other people.

Figure 1:
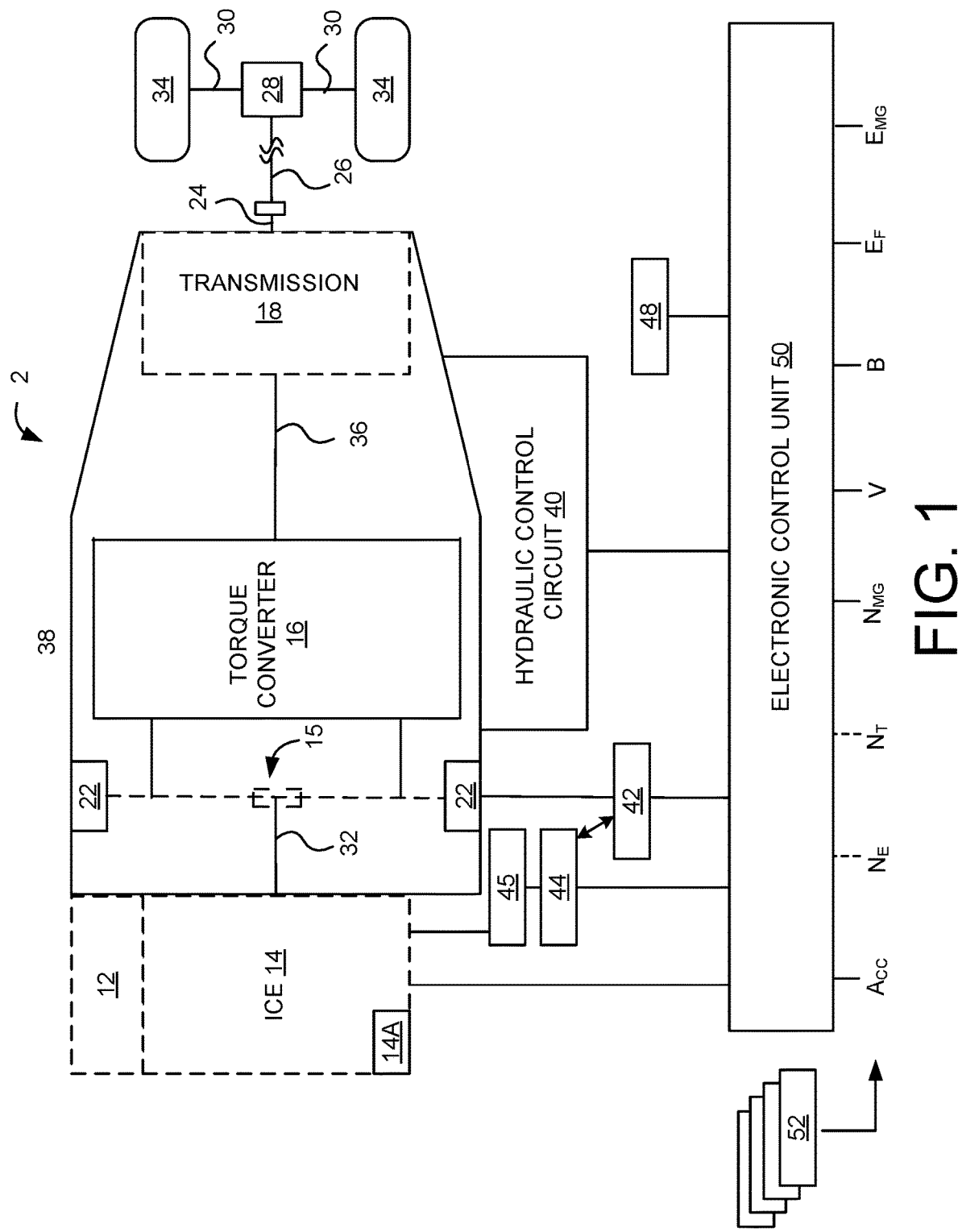
FIG. 1 is a schematic representation of an example hybrid vehicle with which embodiments of the systems and methods disclosed herein may be implemented.

The systems and methods disclosed herein may be implemented with any of a number of different vehicles and vehicle types. For example, the systems and methods disclosed herein may be used with automobiles, trucks, motorcycles, recreational vehicles and other like on- or off-road vehicles. In addition, the principals disclosed herein may also extend to other vehicle types as well. An example hybrid electric vehicle (HEV) in which embodiments of the disclosed technology may be implemented is illustrated in FIG. 1. Although the example described with reference to FIG. 1 is a hybrid type of vehicle, the systems and methods for sharing map data over transmission media selected according to an urgency level of the map data can be implemented in other types of vehicle including gasoline- or diesel-powered vehicles, fuel-cell vehicles, electric vehicles, or other vehicles.

FIG. 1 illustrates a drive system of a vehicle 102 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

As an HEV, vehicle 2 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 102 relies on the motive force generated at least by internal combustion engine 14, and a clutch 15 may be included to engage engine 14. In the EV travel mode, vehicle 2 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 2 and is powered electrically via a battery 44. Battery 44 may be implemented as one or more batteries or other power storage devices including, for example, lead-acid batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 102 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 102. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 14 (engine RPM), a rotational speed, $N_{MG}$, of the motor 22 (motor rotational speed), and vehicle speed, $N_V$. These may also include torque converter 16 output, $N_T$ (e.g., output amps indicative of motor output), brake operation amount/pressure, B, battery SOC (i.e., the charged amount for battery 44 detected by an SOC sensor). Accordingly, vehicle 102 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (internal combustion engine 14+MG 12) efficiency, acceleration, $A_{CC}$, etc.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

The examples of FIG. 1 is provided for illustration purposes only as examples of vehicle systems with which embodiments of the disclosed technology may be implemented. One of ordinary skill in the art reading this description will understand how the disclosed embodiments can be implemented with vehicle platforms.

Figure 2:
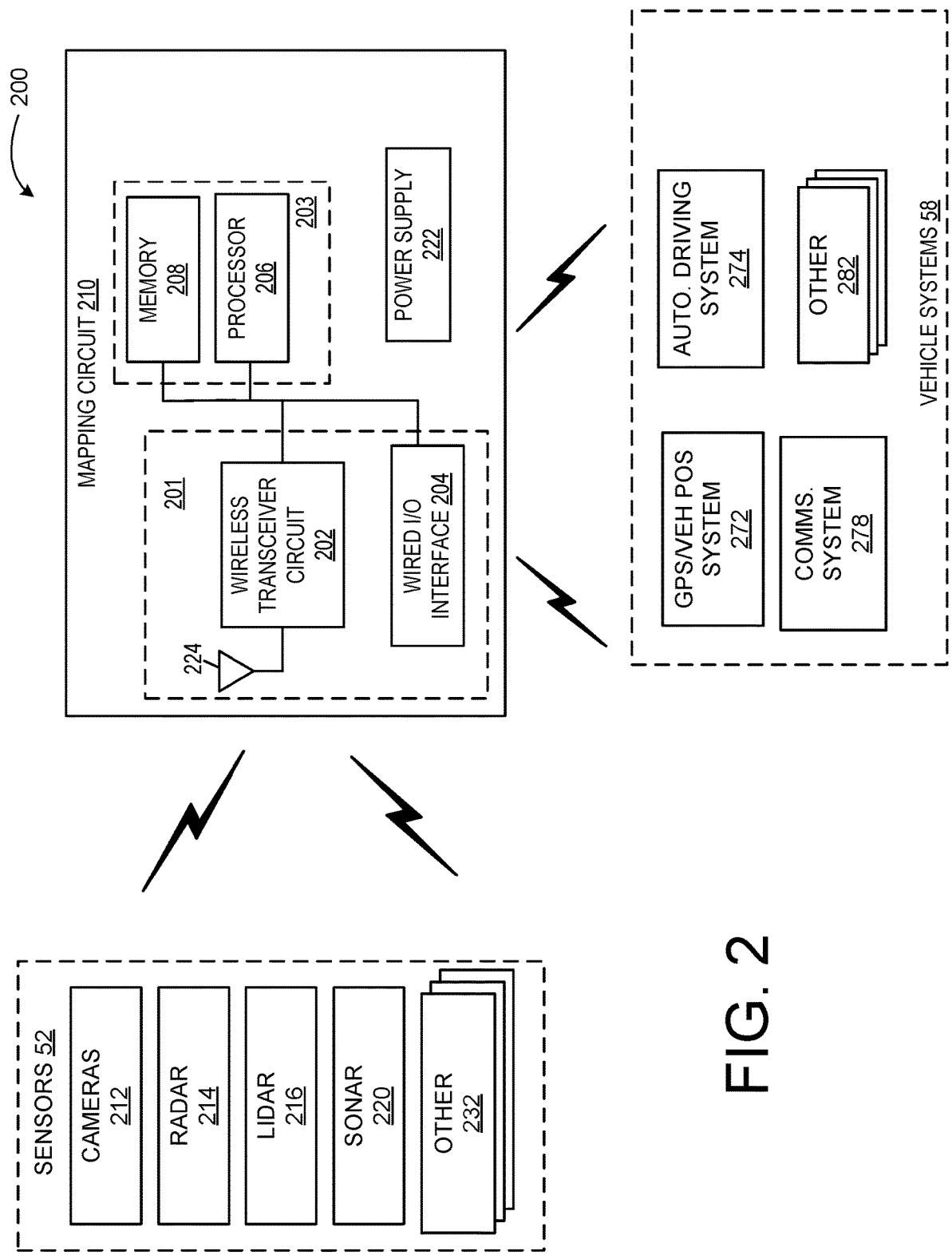
FIG. 2 illustrates an example architecture for sharing vehicle map data over transmission media selected according to urgency of the map data according to embodiments of the disclosed technology.

FIG. 2 illustrates an example architecture for sharing vehicle map data over transmission media selected according to urgency of the map data in accordance with one embodiment of the systems and methods described herein. Referring now to FIG. 2, in this example, a mapping system 200 includes a mapping circuit 210, a plurality of sensors 52, and a plurality of vehicle systems 58. Sensors 52 and vehicle systems 58 can communicate with mapping circuit 210 via a wired or wireless communication interface. Although sensors 52 and vehicle systems 58 are depicted as communicating with mapping circuit 210, they can also communicate with each other as well as with other vehicle systems. Mapping circuit 210 can be implemented as an ECU or as part of an ECU such as, for example electronic control unit 50. In other embodiments, mapping circuit 210 can be implemented independently of the ECU.

Mapping circuit 210 in this example includes a communication circuit 201, a decision circuit 203 (including a processor 206 and memory 208 in this example), and a power supply 222. Components of mapping circuit 210 are illustrated as communicating with each other via a data bus, although other communication in interfaces can be included.

Processor 206 can include a GPU, CPU, microprocessor, or any other suitable processing system. The memory 208 may include one or more various forms of memory or data storage (e.g., flash, RAM, etc.) that may be used to store instructions and variables for processor 206 as well as any other suitable information. Memory 208 can be made up of one or more modules of one or more different types of memory, and may be configured to store data and other information as well as operational instructions that may be used by the processor 206 to mapping circuit 210.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a mapping circuit 210.

Communication circuit 201 either or both a wireless transceiver circuit 202 with an associated antenna 224 and a wired I/O interface 204 with an associated hardwired data port (not illustrated). As this example illustrates, communications with mapping circuit 210 can include either or both wired and wireless communications circuits 201. Wireless transceiver circuit 202 can include a transmitter and a receiver (not shown) to allow wireless communications via any of a number of communication protocols such as, for example, Wi-Fi, Bluetooth, near field communications (NFC), Zigbee, and any of a number of other wireless communication protocols whether standardized, proprietary, open, point-to-point, networked or otherwise. Antenna 224 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by mapping circuit 210 to/from other entities such as sensors 52 and vehicle systems 58.

Wired I/O interface 204 can include a transmitter and a receiver (not shown) for hardwired communications with other devices. For example, wired I/O interface 204 can provide a hardwired interface to other components, including sensors 52 and vehicle systems 58. Wired I/O interface 204 can communicate with other devices using Ethernet or any of a number of other wired communication protocols whether standardized, proprietary, open, point-to-point, networked or otherwise.

Power supply 222 can include one or more of a battery or batteries (such as, e.g., Li-ion, Li-Polymer, NiMH, NiCd, NiZn, and NiH$_2$, to name a few, whether rechargeable or primary batteries,), a power connector (e.g., to connect to vehicle supplied power, etc.), an energy harvester (e.g., solar cells, piezoelectric system, etc.), or it can include any other suitable power supply.

Sensors 52 can include, for example, sensors 52 such as those described above with reference to the example of FIG. 1. Sensors 52 can include additional sensors that may or not otherwise be included on a standard vehicle 10 with which the mapping system 200 is implemented. In the illustrated example, sensors 52 include cameras 212, radar 214, lidar 216, and sonar 220. Additional sensors 52 can also be included as may be appropriate for a given implementation of mapping system 200.

Vehicle systems 58 can include any of a number of different vehicle components or subsystems used to control or monitor various aspects of the vehicle and its performance. In this example, the vehicle systems 58 include a GPS or other vehicle positioning system 272, an autonomous driving system 274, a communications system 278, and other vehicle systems.

During operation, mapping circuit 210 can receive information from various vehicle sensors 52. Communication circuit 201 can be used to transmit and receive information between mapping circuit 210 and sensors 52, and mapping circuit 210 and vehicle systems 58. Also, sensors 52 may communicate with vehicle systems 58 directly or indirectly (e.g., via communication circuit 201 or otherwise).

In various embodiments, communication circuit 201 can be configured to receive data and other information from sensors 52 and vehicle systems 58. Additionally, communication circuit 201 can be used to send signals or other information to various vehicle systems 58 as part of sharing vehicle map data over transmission media selected according to urgency of the map data. For example, as described in more detail below, communication circuit 201 can be used to send signals to, for example, communications system 278 and/or autonomous driving system 274. Examples of this are described in more detail below.

Figure 3:
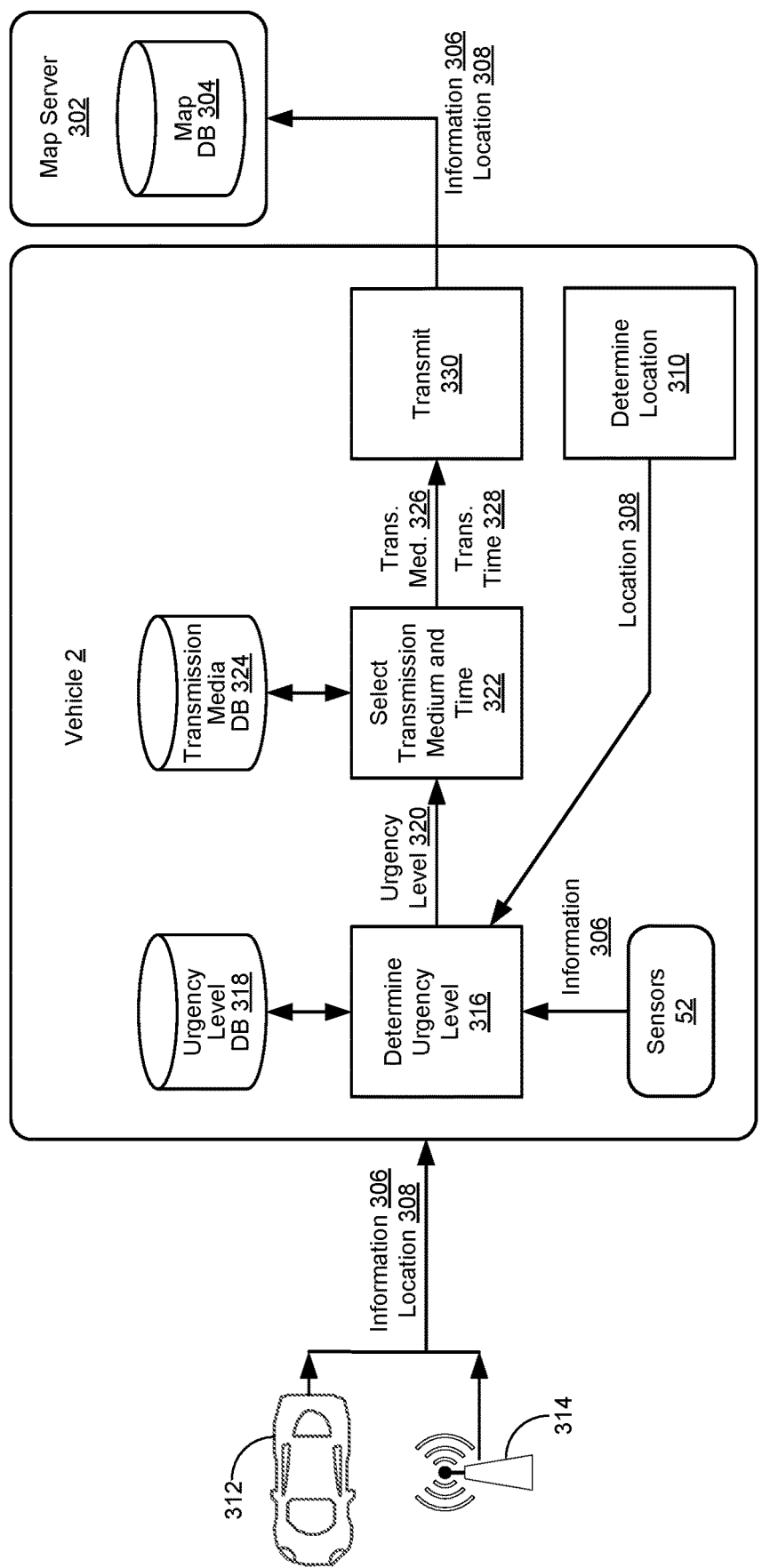
FIG. 3 illustrates a system for uploading vehicle map data over transmission media selected according to urgency of the map data according to embodiments of the disclosed technology.

FIG. 3 illustrates a system for uploading vehicle map data over transmission media selected according to urgency of the map data according to embodiments of the disclosed technology. Referring to FIG. 3, a central map database 304 may store map data, for example for distribution to vehicles, roadside infrastructure, smartphones, and the like. The vehicle 2 may transmit map data to the map server 302 over one or more of a plurality of transmission media. The transmission media may be selected according to an urgency level of the map data. The map data may include, for example, information 306 related to a road. The map data may also include a location 308 related to the information 306. In embodiments where the vehicle 2 generates the information 306, the location 308 may be a location of the vehicle 2 where the information is obtained (e.g., a location correlated to the information), and may be determined by the vehicle, at 310 or by infrastructure elements. Referring to the example of FIG. 2, the location 308 may be determined by the vehicle positioning system 272 of the vehicle 2. In embodiments where the vehicle 2 receives the information 306, the location 308 may be a location where the information 306 was generated or received.

In some embodiments, the information 306 may be collected by sensors 52 of the vehicle 2. Referring to FIG. 2, the sensors 52 may include cameras 212, radar 214, lidar 216, and sonar 220. The sensors 52 may also include other sensors 232 including, for example, accelerometers to measure wheel displacement or vehicle roll and pitch (e.g., to gather information used to determine conditions of the road). The information 306 may include, for example, information relating to an obstacle in a roadway, a vehicle crash or vehicle stopped in the roadway, a missing traffic sign or malfunctioning traffic signal, road and lane closures, lane direction changes, road conditions, and the like.

In some embodiments, the information 306 may be collected from other vehicles 312, for example using vehicle-to-vehicle communications, or the like. In some embodiments, the information 306 may be collected from infrastructure, such as roadside communication stations 314, for example using infrastructure-to-vehicle communications, or the like. In such embodiments, the location 308 related to the information may accompany the information 306. For example, the information 306 may be related to a missing stop sign, and the related location 308 may specify the location of the missing stop sign.

Referring again to FIG. 3, the vehicle 2 may determine an urgency level 320 of the information 306, at 316. In some embodiments, the urgency level 320 of the information 306 may be determined with reference to an urgency level database (DB) 318. For example, the urgency level database 318 may include one or more tables that relate types of the information 306 to different urgency levels 320. An example table of urgency levels is shown below as Table 1.

TABLE 1

| Information Type | Urgency Level |
| --- | --- |
| Safety, e.g., obstacle in roadway, vehicle crash, vehicle stopped in roadway, missing traffic sign, malfunctioning traffic signal | High |
| Road closure, lane closure, lane direction change, poor road conditions | Medium |
| Routine mapping | Low |

Referring to example Table 1, the urgency levels 320 may include a high urgency level, a medium urgency level, and a low urgency level, although other quantities of levels can be provided. In this example, the types of the information 306 related to the high urgency level may include information that should be shared immediately, for example including information relating to safety such as an obstacle in a roadway, a vehicle crash or vehicle stopped in the roadway, a missing traffic sign or malfunctioning traffic signal, and the like. The types of the information 306 relating to the medium urgency level may include information that is not directly related to safety, but that is still time-sensitive, for example such as information relating to road and lane closures, lane direction changes, and the like. The types of the information 306 relating to the low urgency level may include information that is not related to safety, and that is not time-sensitive, for example such as information collected through routine mapping operations. Other embodiments may feature other numbers of urgency levels, other information types, and other mappings between urgency level and information type.

In some embodiments, other factors may be taken into account when determining an urgency level. In some embodiments, the location 308 related to the information 306 may be considered. For example, a missing stop sign in a lightly traveled area may be considered to have a lower urgency than a missing stop sign at a busy suburban intersection. In some embodiments, a time of day related to the information 306 may be considered. For example, a lane closure during rush hour may be considered to have a higher urgency than a lane closure late at night.

The vehicle 2 may select a transmission medium 326 based on the determined urgency level 320, at 322. In some embodiments, the transmission medium 326 may be selected with reference to a transmission media database (DB) 324. For example, the transmission media database 324 may include one or more tables that relate the transmission media to the urgency levels 320. The transmission media may include, for example, mobile data communications, satellite data communications, pay Wi-Fi hotspots, free Wi-Fi hotspots, vehicle-to-vehicle communications, vehicle-to-infrastructure communications, and the like. For example, the urgency level database 324 may include one or more tables that relate types of the information 306 to different urgency levels 320. An example table is shown below as Table 2.

TABLE 2

| Urgency Level | Transmission Media |
| --- | --- |
| High | Any available transmission media |
| Medium | One of mobile data communications, pay Wi-Fi hotspots, free Wi-Fi hotspots, vehicle-to-vehicle communications |
| Low | Free Wi-Fi hotspots only |

Referring to example Table 2, the urgency levels 320 may include a high urgency level, a medium urgency level, and a low urgency level. The transmission media related to the high urgency level may include any transmission medium. That is, for information related to the high urgency level, any transmission medium may be selected. In cases where multiple transmission media may be selected, one or more of the media may be selected according to characteristics of the media, which may also be stored in the transmission media database 324. These characteristics may include, for example, speed, availability, bandwidth, cost, and the like. When multiple transmission media are selected, the information 306 and location 308 may be sent over multiple transmission media to ensure rapid delivery.

Referring again to example Table 2, the transmission media related to the medium urgency level include mobile data communications, pay Wi-Fi hotspots, free Wi-Fi hotspots, and vehicle-to-vehicle communications. In cases where only one of a plurality of transmission media may be selected, the transmission medium may be selected according to characteristics of the transmission media, for example such as those described above. In example of Table 2, the transmission media relating to the low urgency level are limited to free Wi-Fi hotspots only. Other embodiments may feature other numbers of urgency levels, other transmission media, and other mappings between urgency level and transmission media.

In some embodiments, the selection of transmission media may be based on the location 308. For example, when the information 306 is urgent for nearby vehicles, vehicle-to-vehicle communications may be selected as the transmission medium 326. As an example, when the information 306 concerns an erratic driver, vehicle-to-vehicle communications may be selected as the transmission medium 326 in order to alert nearby vehicles as soon as possible.

In some embodiments, in addition to selecting a transmission medium 326, the vehicle may also select a time of transmission 328, at 322. The time of transmission 328 may be selected according to a number of factors. In some embodiments, the time of transmission 328 may be selected according to the urgency level 320 of the information 306. For example, information 306 having a high determined level of urgency 320 may be selected to be transmitted immediately. In some embodiments, the time of transmission 328 may be selected according to the selected transmission medium 326. For example, when the selected transmission medium 326 is a free Wi-Fi hotspot, the time of transmission 328 may be selected as the next time a free Wi-Fi hotspot is available to the vehicle 2.

Once the transmission medium or media 326 has been selected, and if used, the time of transmission 328 has been selected, the information 306 and location 308 are transmitted, at 330. That is, the information 306, and location 308 if used, are transmitted over the selected transmission medium or media 326. In embodiments where the transmission time 328 is determined, the transmission takes place at the determined transmission time 328.

Sharing map information over transmission media selected according to the urgency of the map information could include many benefits. Sharing map information having a high urgency level quickly ensures the rapid dissemination of that information to other vehicles, and to emergency personnel, thereby increasing safety for all concerned. And sharing map information having a lower urgency over less-costly transmission media reduces expenses of sharing the map information.

Figure 4:
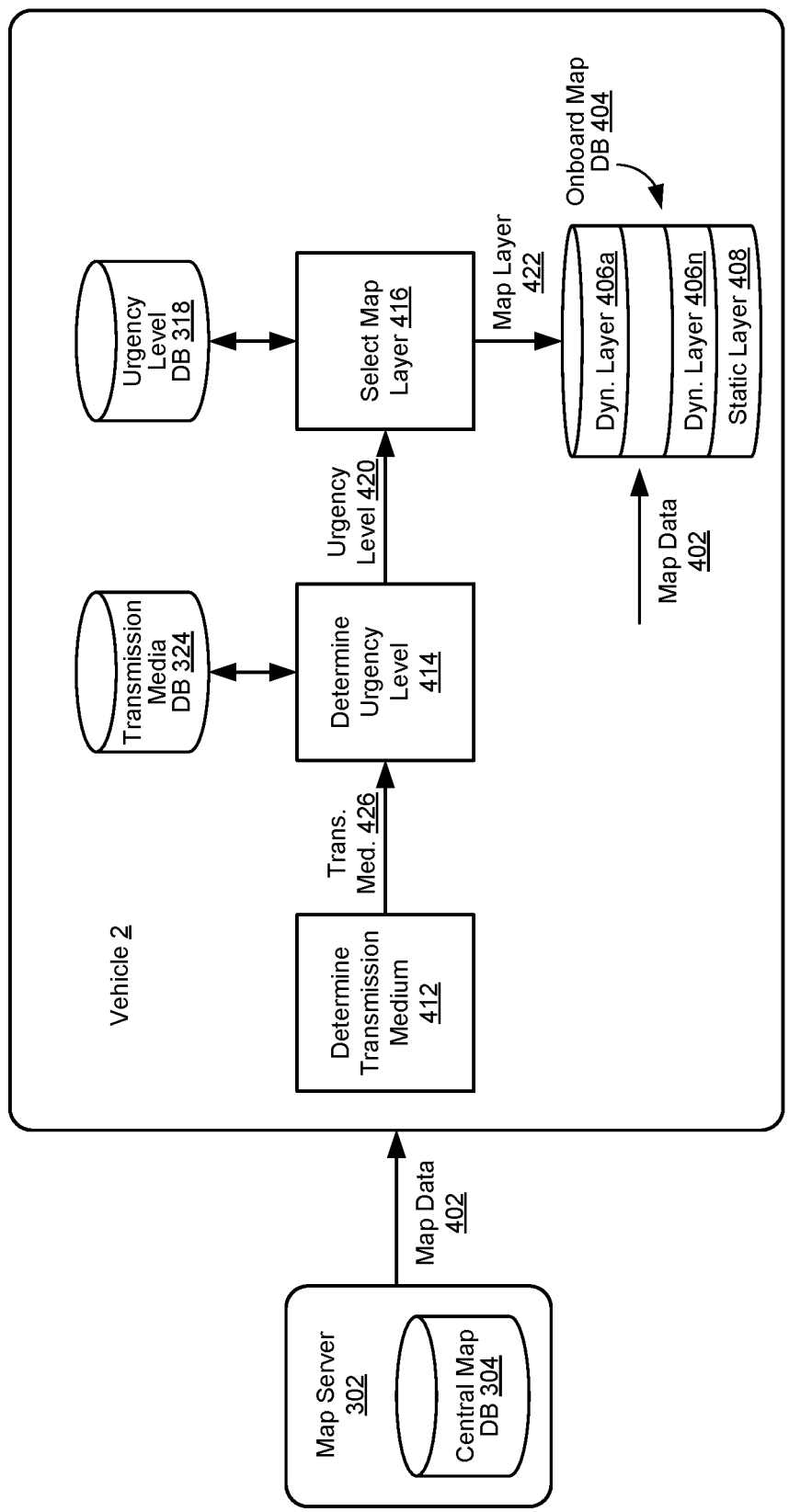
FIG. 4 illustrates a system for downloading vehicle map data according to urgency of the map data according to embodiments of the disclosed technology.

FIG. 4 illustrates a system for downloading vehicle map data according to urgency of the map data according to embodiments of the disclosed technology. Referring to FIG. 4, the map data 402 may be stored in a central map database (DB) 304 in a map server 302. The vehicle 2 may receive the map data 402 from the map server 302 over one of a plurality of transmission media. The map data 402 may include information 306 related to a road. As used herein, the term "road" may apply to any route traversed by any vehicle, including highways, local roads, paths, driveways, alleys, and the like. The map data 402 may also include a location 308 related to the information 306.

The vehicle 2 stores map data 402 in an onboard map database (DB) 404. The onboard map database 404 may include a plurality of layers. For example, the onboard map database may include a static layer 408, and a plurality of dynamic layers 406a-n. The static layer 408 may include map data 402 that changes rarely, if ever, for example such as data concerning the locations of cities, terrain data, interstate highway locations, and the like. The dynamic layers 406 may include map data 402 that changes with time. The dynamic layers 406 may be differentiated by the frequency with which the stored map data 402 changes. For example, a low-frequency layer 406 may include map data relating to roads in developing suburbs, where new roads are occasionally added. In contrast, a high-frequency layer 406 may include map data 402 relating to pedestrians and vehicles in or near the roadway.

In some embodiments, on receiving new map data 402, the vehicle 2 may select one or more layers 406, 408 of the onboard map database 404 to store the map data 402 according to an urgency level 420 related to the new map data 402. In some embodiments, the urgency level 420 may be selected according to the transmission medium 412 over which the map data 402 is received.

Referring to FIG. 4, upon receiving map data 402, the vehicle 2 determines the transmission medium 426 over which the map data 402 was received, at 412. Based on the determined transmission medium 426, the vehicle 2 determines an urgency level 420 of the map data 402, at 414. In some embodiments, the vehicle 2 may determine the urgency level 420 with reference to the transmission media database 324. The transmission media database 324 may include one or more tables that relate urgency levels to transmission media. An example table is shown below as Table 3.

Referring to example Table 3, a high urgency level 420 may be determined for map data 402 received over a satellite link. A medium urgency level 420 may be determined for map data 402 received by mobile data communications, pay Wi-Fi hotspots, vehicle-to-vehicle communications, and infrastructure-to-vehicle communications. A low urgency level 420 may be determined for map data 402 received from free Wi-Fi hotspots. Other embodiments may feature other numbers of urgency levels, other transmission media, and other mappings between urgency level and transmission media.

TABLE 3

| Transmission Media | Urgency Level |
|---|---|
| Satellite link, 5G | High |
| Other mobile data communications, pay Wi-Fi hotspots, vehicle-to-vehicle communications, infrastructure-to-vehicle communications | Medium |
| Free Wi-Fi hotspots | Low |

The vehicle 2 may select a layer 406, 408 of the onboard map database 404 to store the received map data 402 according to the determined urgency level 420, at 416. In some embodiments, the vehicle 2 may select the layer 406, 408 with reference to the urgency level database 318. The urgency level database 318 may include one or more tables that relate urgency levels 420 to map layers 406, 408. An example table is shown below as Table 4.

TABLE 4

| Urgency Level | Transmission Media |
|---|---|
| High | High-frequency layer |
| Medium | Low-frequency layer |
| Low | Static layer |

Referring to example Table 4, for any map data 402 having a high urgency level 420, the dynamic map layer 406 having the highest update frequency is selected. For map data 402 having a medium urgency level 420, a dynamic map layer 406 having a low update frequency is selected. And for map data 402 having a low urgency level 420, the static layer 408 is selected. Other embodiments may feature other numbers of urgency levels, other map layers, and other mappings between urgency level and map layers.

The vehicle 2 may indicate the selected map layer 422 to the onboard map database 404. The vehicle 2 then stores the map data 402 in the selected map layer 422. In some embodiments, the map data 402 received by the vehicle 2 may be determined to have multiple urgency levels 420. In such embodiments, the map data may be parsed according to the urgency levels 420, and stored in multiple map layers 406, 408 according to the determined multiple urgency levels 420.

Selecting map layers according to the urgency level of the received map data may have many benefits. For example, the vehicle 2 may frequently share high-frequency map data with other vehicles using vehicle-to-vehicle communications. In this example, storing the most urgent map data in the highest-frequency layer of the onboard map database ensures that urgent map data shared with other vehicles quickly.

In some embodiments, the vehicle 2 is an autonomous vehicle. Referring again to FIG. 2, in such embodiments, the autonomous driving system 274 employs the onboard map database 404 to navigate the vehicle 2. In such autonomous vehicles, the freshness of the data in the onboard map database 404 is important. With the increasing prevalence of such autonomous vehicles, sharing map data according to the disclosed embodiments provides a safer road environment.

Figure 5:
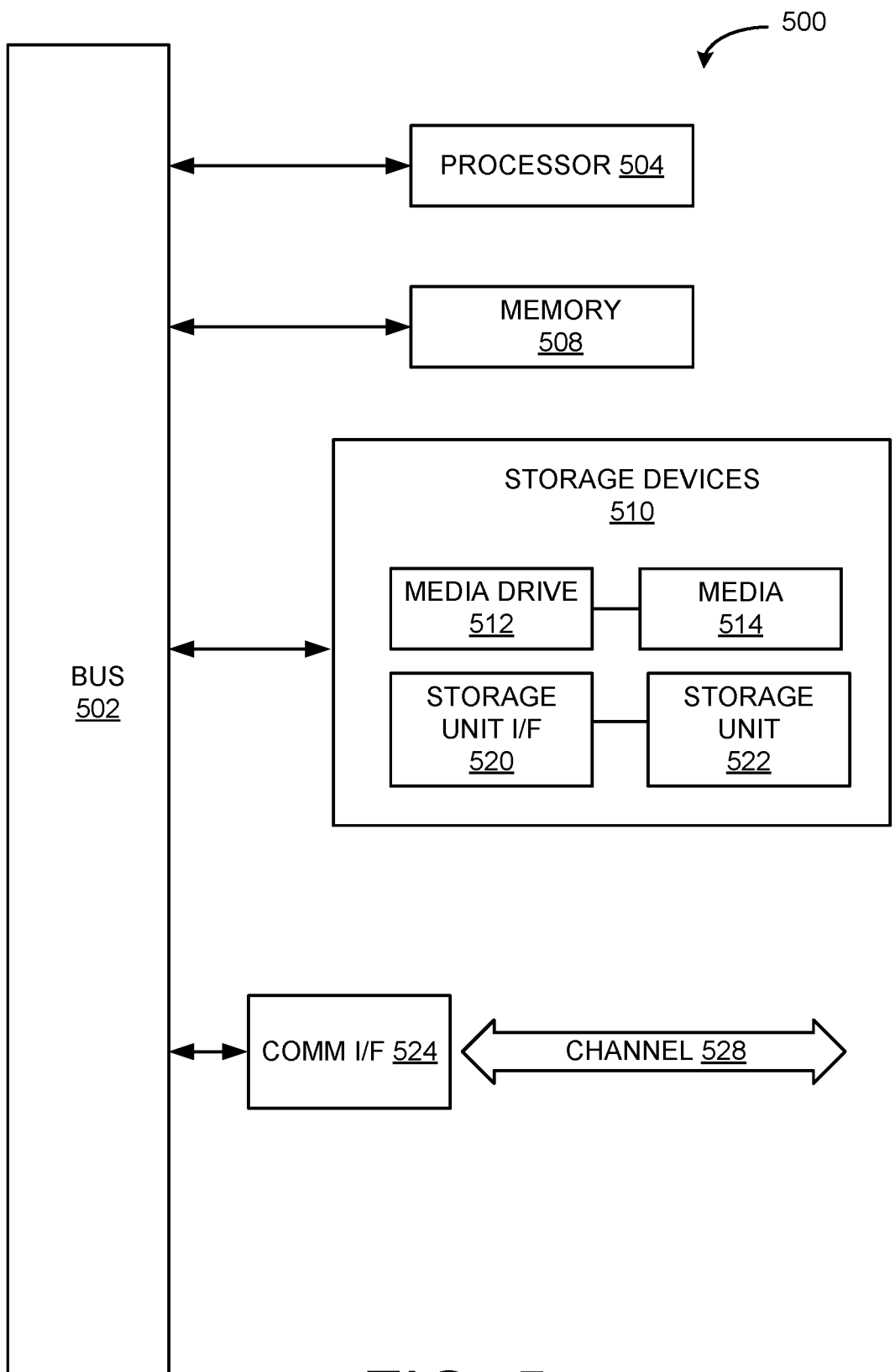
FIG. 5 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. This can include a processor 504. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A vehicle, comprising:
   a hardware processor; and
   a non-transitory machine-readable storage medium encoded with instructions executable by the hardware processor to perform a method comprising:
   receiving information relating to a road;
   determining an urgency level of the information;
   selecting one of a plurality of wireless data communications mechanisms according to the determined urgency level;
   transmitting the information over the selected wireless data communications mechanism;
   downloading map data over the selected wireless data communications mechanism;
   selecting one of a plurality of dynamic layers of a map database stored in the vehicle according to the determined urgency level; and
   updating the selected dynamic layer according to the downloaded map data.

2. The vehicle of claim 1, the method further comprising:
   determining a location of the vehicle; and
   transmitting the location of the vehicle, at the determined time of transmission, over the selected wireless data communications mechanism.

3. The vehicle of claim 1, the method further comprising:
   determining a location of the vehicle; and
   selecting the one of the plurality of wireless data communications mechanisms according to the determined urgency level and the location of the vehicle.

4. The vehicle of claim 1, wherein receiving information relating to the road comprises:
   receiving the information as a message from another vehicle.

5. The vehicle of claim 1, wherein receiving information relating to the road comprises:
   receiving the information from a sensor of the vehicle.

6. The vehicle of claim 1, the method further comprising:
   determining a time of transmission according to at least one of (i) the determined urgency level and (ii) the selected wireless data communications mechanism; and
   transmitting the information, at the determined time of transmission, over the selected wireless data communications mechanism.

7. A non-transitory machine-readable storage medium encoded with instructions executable by a hardware processor of a computing component, the machine-readable storage medium comprising instructions to cause the hardware processor to perform a method for a vehicle, the method comprising:
   receiving information relating to a road;
   determining an urgency level of the information;
   selecting one of a plurality of wireless data communications mechanisms according to the determined urgency level;
   transmitting the information over the selected wireless data communications mechanism;
   downloading map data over the selected wireless data communications mechanism;
   selecting one of a plurality of dynamic layers of a map database stored in the vehicle according to the determined urgency level; and
   updating the selected dynamic layer according to the downloaded map data.

8. The medium of claim 7, the method further comprising:
   determining a location of the vehicle; and
   transmitting the location of the vehicle, at the determined time of transmission, over the selected wireless data communications mechanism.

9. The medium of claim 7, the method further comprising:
   determining a location of the vehicle; and selecting the one of the plurality of wireless data communications mechanisms according to the determined urgency level and the location of the vehicle.

10. The medium of claim 7, wherein receiving information relating to the road comprises:
receiving the information as a message from another vehicle.

11. The medium of claim 7, wherein receiving information relating to the road comprises:
receiving the information from a sensor of the vehicle.

12. The medium of claim 7, the method further comprising:
determining a time of transmission according to at least one of (i) the determined urgency level and (ii) the selected wireless data communications mechanism; and
transmitting the information, at the determined time of transmission, over the selected wireless data communications mechanism.

13. A method for a vehicle, the method comprising:
receiving information relating to a road;
determining an urgency level of the information;
selecting one of a plurality of wireless data communications mechanisms according to the determined urgency level;
transmitting the information over the selected wireless data communications mechanism;
downloading map data over the selected wireless data communications mechanism;
selecting one of a plurality of dynamic layers of a map database stored in the vehicle according to the determined urgency level; and
updating the selected dynamic layer according to the downloaded map data.

14. The method of claim 13, further comprising:
determining a location of the vehicle; and
transmitting the location of the vehicle, at the determined time of transmission, over the selected wireless data communications mechanism.

15. The method of claim 13, further comprising:
determining a location of the vehicle; and
selecting the one of the plurality of wireless data communications mechanisms according to the determined urgency level and the location of the vehicle.

16. The method of claim 13, wherein receiving information relating to the road comprises:
receiving the information as a message from another vehicle.

17. The method of claim 13, wherein receiving information relating to the road comprises:
receiving the information from a sensor of the vehicle.

18. The method of claim 13, further comprising:
determining a time of transmission according to at least one of (i) the determined urgency level and (ii) the selected wireless data communications mechanism; and
transmitting the information, at the determined time of transmission, over the selected wireless data communications mechanism.

* * * * *